Feb. 5, 1935.  N. L. SNOW  1,989,773
DEDUSTING APPARATUS
Filed June 30, 1930    3 Sheets-Sheet 1
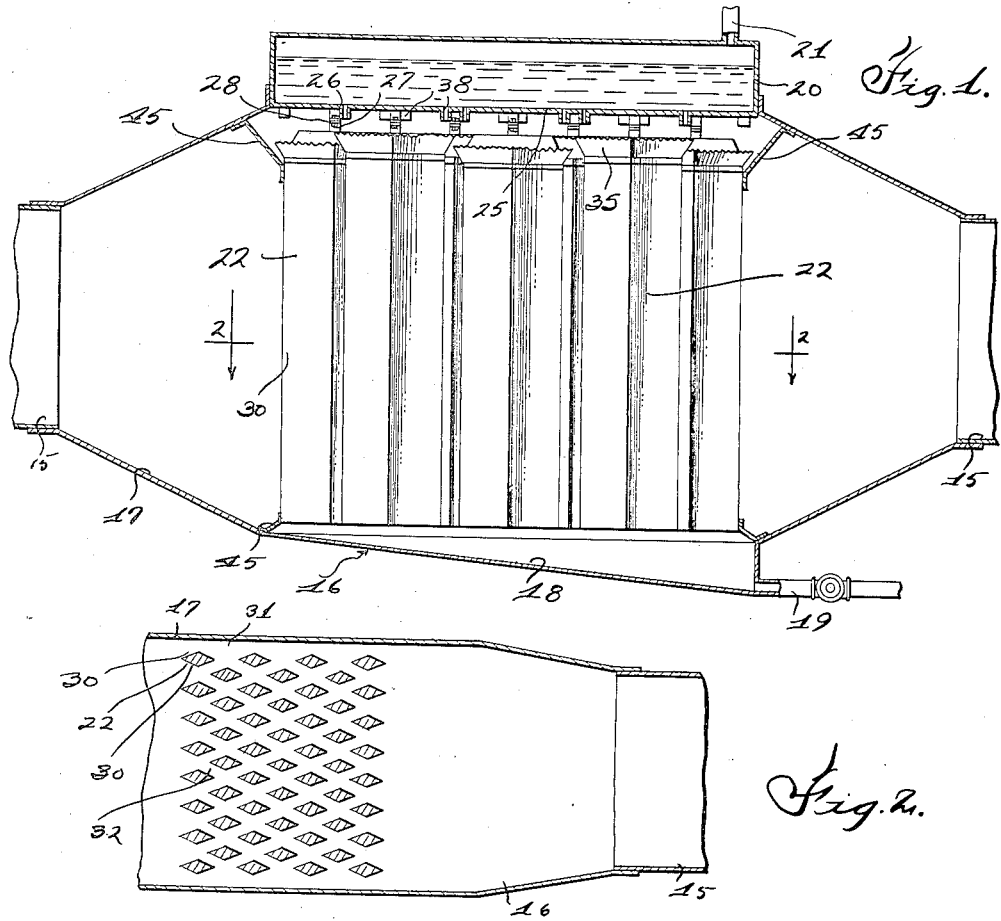
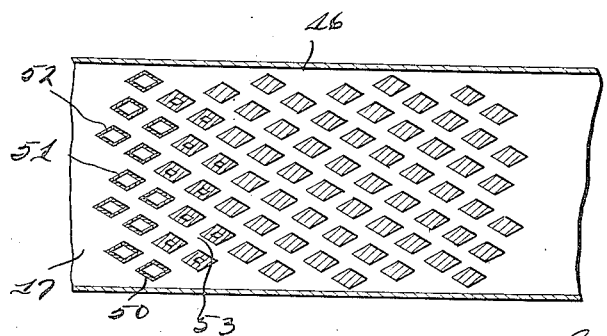
INVENTOR
Norman L. Snow
ATTORNEYS Feb. 5, 1935.   N. L. SNOW   1,989,773
DEDUSTING APPARATUS
Filed June 30, 1930   3 Sheets-Sheet 2

INVENTOR
Norman L. Snow
BY Whittemore Hulbert
Whittemore & Belknap
ATTORNEYS

Feb. 5, 1935. N. L. SNOW 1,989,773
DEDUSTING APPARATUS
Filed June 30, 1930   3 Sheets-Sheet 3

INVENTOR
Norman L. Snow
BY
Whittemore, Hulbert, Whittemore & Belknap
ATTORNEYS

Patented Feb. 5, 1935

1,989,773

UNITED STATES PATENT OFFICE 1,989,773

DEDUSTING APPARATUS

Norman L. Snow, New Canaan, Conn., assignor to Diamond Power Specialty Corporation, Detroit, Mich., a corporation of Michigan Application June 30, 1930, Serial No. 464,985

11 Claims. (Cl. 183—21)

This invention relates to a de-dusting apparatus and has particular reference to an apparatus for removing the dust and other objectionable elements from a stream of flowing gas.

One of the primary objects of this invention is to provide a device of the above mentioned character in which elements having wetted surfaces are provided, these elements being of improved shape and arrangement.

Other objects and advantages of this invention, together with the numerous novel details of construction and arrangement of parts, will become more apparent as the following description proceeds, particularly when reference is had to the accompanying drawings, wherein:

Figure 1 is a vertical sectional view through an apparatus constructed in accordance with the teachings of this invention;

Figure 2 is a horizontal sectional view taken substantially on the line 2—2 of Figure 1;

Figures 5, 6, 7, 8, 9, 10 and 11 are views similar to Figure 2 showing slightly modified arrangements and forms of baffle elements which may be used in connection with the apparatus;

Figure 3:
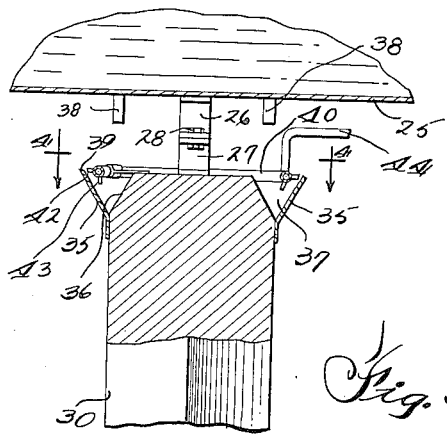
Figure 3 is an enlarged sectional view of a portion of the structure shown in Figure 1.

Referring then particularly to the drawings wherein like reference characters designate corresponding parts throughout all views, the reference character 15 designates a gas passage adapted to receive gas from any suitable source (not shown) and to conduct the same to any suitable point of discharge or use. Arranged in this gas passage and intermediate the ends of the same, is a device designated generally by the reference character 16 for removing the dust and other objectionable elements from the gas flowing through the passage prior to the discharge of this gas.

The device 16 comprises a casing 17 so associated with the gas passage that the gas flowing through the gas passage must pass through this casing. The casing is preferably provided with the sloping bottom 18 provided with a valve controlled outlet 19 and is also preferably provided at its top with a tank 20 adapted to be supplied with a dust collecting fluid in any desired manner, as by a supply conduit 21. The casing 17 is preferably relatively long and narrow, being but slightly wider than the gas passage, as clearly illustrated in Figure 2 of the drawings, and arranged in the casing and in the path of the flow of gas through the same are a plurality of baffle elements 22.

The baffle elements are thick members, or in other words, members of appreciable width and they are formed with flat exterior surfaces for a purpose which will hereinafter be more fully described. They may comprise solid cast members, cast members which have been cored out, members formed of plates fixed together, or members formed in any desired manner to provide the desired cross sectional width, it being understood that the term "width" has reference to the overall width rather than to any thickness of the material itself. These members are preferably suspended from the bottom wall 25 of the tank by lugs 26 and 27, the former being welded or otherwise fixed to the bottom of the tank and the latter being fixed to the tops of the elements, these lugs being secured together by suitable means such as the bolts 28.

As illustrated in Figure 2 of the drawings, each baffle element may comprise a solid cast member having an elongated diamond cross sectional shape, and having flat surfaces 30 adapted to be positioned in the path of the gas flowing through the casing. The baffle elements may be arranged in rows 31, transversely of the casing, with the elements in one row staggered relative to the elements in the next adjacent row to provide the gas passages 32 between the elements. Thus, the gas flowing through the casing is divided into a number of relatively fine streams but, in view of the fact that the passages 32 do not vary in width to any great extent throughout the device, the gas may flow through the casing with substantially no loss of pressure due to turbulence.

Figure 4:
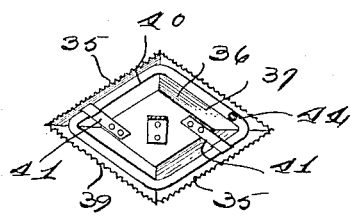
Figure 4 is a fragmentary sectional view taken substantially on the line 4—4 of Figure 3.

The invention contemplates the provision of means for wetting or flowing a dust collecting fluid over the flat surfaces 30 of the elements so that both sides of the passages 32 through which the gas must flow will be covered with this fluid. To accomplish this, the structure shown in Figures 3 and 4 may be provided, and by reference to these figures, it will be noted that each element is provided at its upper end with an outwardly inclined flange 35 and that the end of each element is inwardly inclined as at 36 to cooperate with the flange to form a trough 37 for receiving a fluid. Nozzles 38 fixed in the bottom wall of the tank 20 are arranged to discharge the fluid from the tank 20 into the troughs 37 and the upper edges of the flanges 35 are serrated to provide the saw teeth 39 between which the fluid will flow from the trough downwardly over the flat surfaces of the elements.

It frequently happens that dirt or the like clogs the trough 37 and the spaces between the saw teeth, and to provide for a cleaning of these portions of the apparatus, a conduit 40 is located adjacent the top of each element, this conduit being supported in place by suitable supporting brackets 41 extending laterally from the top of the element. The conduit 40 is provided with nozzles 42 and 43, the former being directed toward the openings between the saw teeth and the latter being directed toward the base of the trough. A fluid under pressure is supplied to the conduit 40 by a valve controlled supply pipe 44 so that whenever desired, fluid under pressure may be discharged from the conduit 40 to effect a flushing of the bottoms of the troughs and of the spaces between the saw teeth. As illustrated in Figure 1 of the drawings, the flanges 35 are preferably staggered as to height on adjacent elements to provide for a close spacing of the elements, while closure plates 45 are arranged adjacent the top and bottom of the casing to prevent a flow of the gas over the upper ends or under the lower ends of the baffle elements.

From the above it is believed that the operation of this form of the invention will be clearly apparent. Dust laden gas flowing through the passage 15 will be compelled to flow through the passages 32 in the casing 17. Thus, the gas will be divided into a plurality of relatively fine streams and these streams will be compelled to contact with the surfaces 30 of the baffle elements which define the passages 32. A dust collecting fluid will be discharged from the tank 20 into the troughs 37 and will flow from these troughs over the tops of the flanges 35 and down the flat surfaces of the elements. The dust particles and the like carried by the gas will be collected by the fluid flowing over the flat surfaces of the elements and this dust laden fluid will be discharged into the bottom of the casing 17 where it will be directed to the outlet 19 by the inclined wall 18. Thus, the gas will be discharged from the casing free from dust particles and other objectionable elements.

In Figure 5 a slightly modified arrangement is shown in which diamond-shaped elements 50 are arranged in rows 51 and 52 diagonally of the casing. It will be noted that certain of these elements are shown as comprising cast members cored out, while others are shown as being formed of plates welded or otherwise fixed together. It is to be understood, however, that these showings are diagrammatic only and that the elements may be formed in any manner to provide the desired width. When the elements are thus arranged, the elements in each row may be staggered relative to the elements in the next adjacent row to provide gas passages 53 which, while being of substantially constant cross section throughout the length of the casing, are not continuous from end to end. Thus, the gas flowing between the sides of the baffle elements in one row will come into contact with the sides of the baffle elements in the next adjacent row so that the gas flowing through the casing will be compelled to come into intimate contact with the flat surfaces of all of the elements. Obviously, these elements may be suspended within the casing and may have their surfaces wetted in the same manner as the elements in the first described form of construction.

Figure 6:
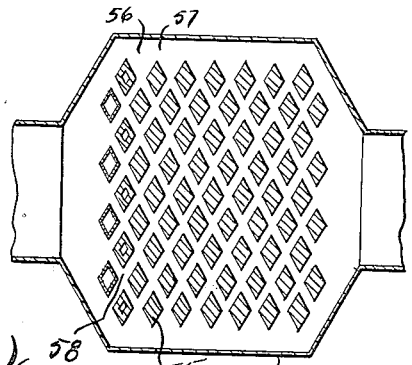

In Figure 6 a further modified arrangement of baffle elements is disclosed and by reference to this figure, it will be noted that the baffle elements 55, which are diamond-shaped in cross section and which are thus similar to the baffle elements 22 are arranged with their broad sides opposed to the flow of gas. These elements may be arranged in rows 56 and 57 transversely of the casing 17', the elements in each row being staggered relative to the elements in the next adjacent row to provide gas passages 58 through which the gas must flow in its passage through the casing. Obviously, the gas will be caused to contact with the flat surfaces of these baffle elements and these surfaces may be wetted to collect the dust and the like carried by the gas. It will be noted that when the elements are thus arranged, that is, with their longer axes crosswise of the casing 17', the latter will be relatively wide, but will be materially shorter than the casing 17.

Figure 7:
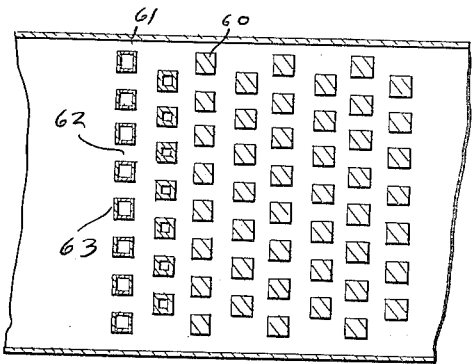

In Figure 7 there is shown a construction in which a slightly modified form of baffle element is substituted for the baffle elements previously described. By reference to this figure, it will be noted that the baffle elements 60 are substantially square in cross section and that these elements are arranged in rows 61 transversely of the casing with the elements in each row staggered relative to the elements in the next adjacent row to form gas passages 62 through which the gas must flow in its passage through the casing. The elements 60 are members of appreciable width and provide the flat surfaces 63 with which the gas must contact. Obviously, these elements may be suspended in the casing in any desired manner, such, for example, as that above described, and the flat surfaces of these elements may be wetted to effect a collection of the dust from the gas stream.

Figure 8:
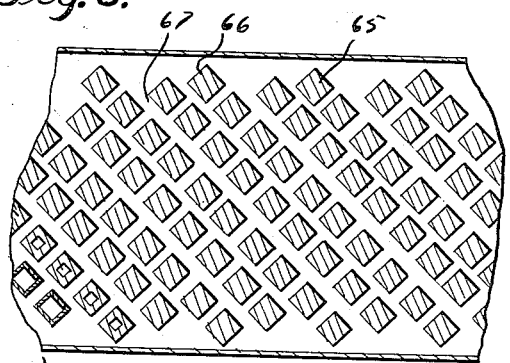

In Figure 8 elements 65 are shown which are similar in cross sectional shape to the elements 60, but these elements are shown as being arranged in rows 66 diagonally of the casing so that the corners of the elements are opposed to the gas flow. The elements in each row are staggered relative to the elements in the next adjacent row to provide gas passages 67 through the casing. It will be noted that by staggering the elements in the manner illustrated, the gas flowing between the elements in one row is directed into contact with the flat sides of the elements in the next adjacent row so that an intimate contact of the gas with the flat surfaces of the elements is effected without, however, causing an unusual turbulence of the gas stream.

Figure 9:
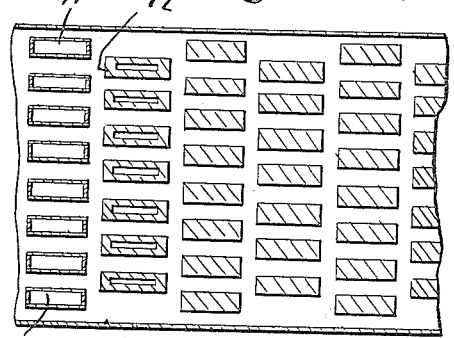

In Figure 9 baffle elements 70 are illustrated as being arranged in rows 71 transversely of the gas passage. These elements are in the form of oblongs or elongated rectangles and are arranged with their short sides opposed to the gas flow, and with the elements in one row staggered relative to the elements in the next adjacent row so that the gas flowing between the elements in one row will be directed into contact with the sides of the elements in the next adjacent row. The elements 70 provide the flat surfaces 72 which may be wetted to effect a removal of the dust particles and the like from the gas stream.

Figure 10:
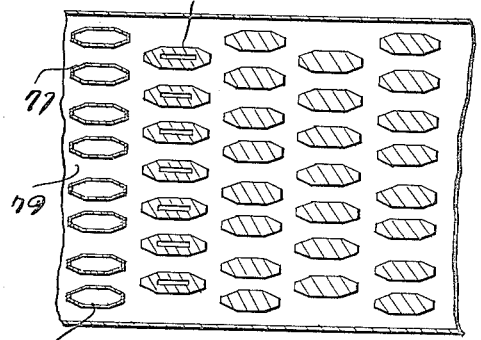

In Figure 10 there is shown an arrangement of baffle elements within a de-duster casing, the elements in this modification being polygonal in cross section. As illustrated, the elements, which are designated by reference character 75, may be elongated to provide the long flat surfaced sides 76 and the relatively short flat surfaced sides 77, the elements in the form shown being octagonal in cross sectional shape. These elements are arranged in rows 78 transversely of the casing with the elements in each row staggered relative to the elements in the next adjacent row to provide gas passages 79. Obviously, the elements may be either octagonal in cross sectional shape, as illustrated, or of any other desired polygonal cross sectional shape.

Figure 11:
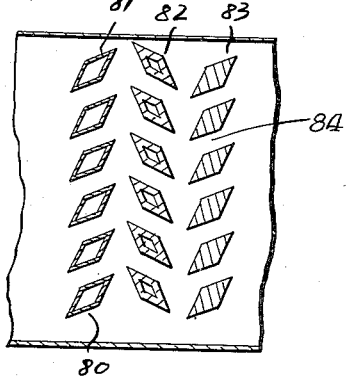

In Figure 11 a further modification in the arrangement of the baffle elements is disclosed. By reference to this figure, it will be noted that baffle elements 80 are provided and that these baffle elements have elongated cross sectional axes which extend diagonally toward the sides of the gas passage. The baffle elements may have elongated diamond cross sectional shapes and thus may be similar to the baffle elements 22 and they have the flat surfaces 81 arranged in the path of gas flow. The baffle elements are arranged in rows 82 and 83 transversely of the gas passage with the longer axes of the elements extending diagonally toward the sides of the casing. Further, the elements in each row may be staggered and angularly disposed relative to the elements in the next adjacent row to provide passages 84 through which the gas must travel in its passage through the casing.

Figure 12:
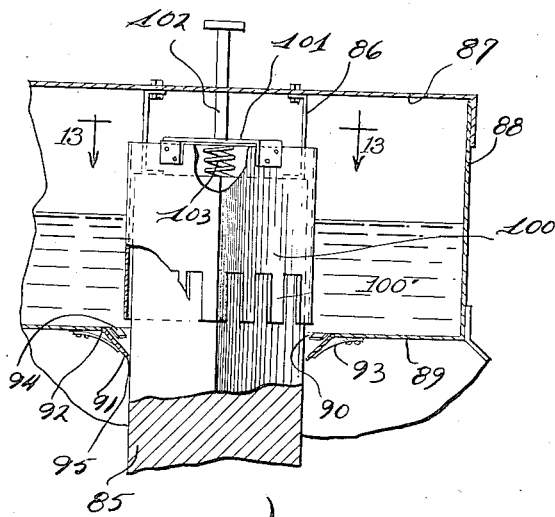
Figure 12 is a view similar to Figure 3 showing a slightly modified form of construction.
Figure 13:
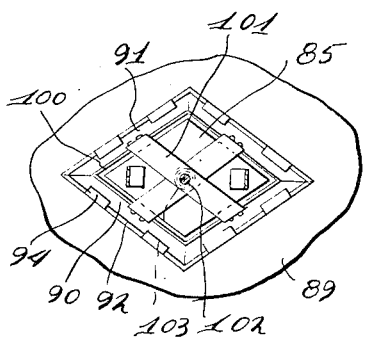
Figure 13 is a sectional view taken substantially on the line 13—13 of Figure 12.

In Figures 12 and 13 a slightly modified construction is shown for wetting the surfaces of the elements, it being understood that the construction disclosed in these figures may be associated with any of the baffle elements above described, regardless of their cross sectional shape. By reference to these figures it will be noted that each baffle element 85 is supported by lugs or the like 86 from the top wall 87 of the liquid supply tank 88, which tank is similar to the tank 20 disclosed in Figure 1. The bottom wall 89 of the tank is provided with the openings 90 through which the baffle elements extend, and surrounding these openings are plates 91 which are pivoted as at 92 to swing toward or away from the baffle elements. A spring 93 urges each plate 91 toward the side of its respective baffle element, while a stop 94 formed on each pivot provides means for limiting inward movement of each plate to provide a passage 95 between each plate and the element, through which the liquid may flow down the side of the element. Thus, water or the like in the tank 88 may be discharged downwardly through the passages 95 to thoroughly wet the sides of the baffle elements as will be readily apparent.

For the purpose of cleaning out any sediment or the like that may collect between the plates 91 and the elements, a sleeve 100 terminating at its lower end in fingers 100' may be slidably mounted on the end of each element within the tank 88. Each sleeve may be provided at its upper end with the straps 101 to which a plunger rod 102 is secured, this plunger rod projecting through the top of the tank as illustrated. A spring 103 arranged between the straps 101 and the top of the element provides for maintaining the sleeve in its raised position, as illustrated in Figure 12.

Whenever it is desired to flush the passages 95, the plungers 102 are depressed, thus forcing the sleeves 100 downwardly and the fingers 100' into engagement with the hinged plates 91. The hinged plates will thus be forced outwardly away from the baffle elements to permit a rushing of the water from the tank 88 down the sides of the elements to clean out any deposits which may have accumulated in the passages 95. Obviously, when downward pressure on the plungers 102 is released, the springs 103 will return the sleeves 100 to their raised positions, while the springs 93 will return the plates 91 to their normal positions, movement of the plates 91 being limited by the stops 94.

From the above it will be noted that the invention provides a de-duster in which baffle elements of appreciable width may be used. The baffle elements may be solid cast members, cast members which are cored out, members which are formed of a plurality of plates welded or otherwise fixed together, or members formed in any desired manner to provide the desired width. These members are provided with flat surfaces and are so arranged in the de-duster casing that the flat surfaces cooperate to form passages through which the gas must travel in its passage through the casing.

It will be found that by providing flat surfaced elements, the dust collecting fluid may be flowed over the surfaces of these elements in a very successful and efficient manner without the utilization of a large quantity of this fluid. As the gas comes in contact with the flat surfaces of the elements, the dust in the gas will be removed by the dust collecting fluid and this dust-laden fluid will be collected at the bottom of the de-duster casing for discharge therefrom. It will be understood that any number of baffle elements may be arranged in each row transversely of the de-duster casing, and that in each case, the baffle elements may be solid members or members formed in any other desired manner. Whenever the term "wetting" is used it is to be understood as meaning applying a dust collecting substance to the surface.

While the invention has been described with considerable detail, it is to be clearly understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a device of the character described, a gas passage, a baffle element arranged in said gas passage, a flange associated with said baffle element and cooperating with the same to form a trough surrounding said baffle element adjacent the top thereof, and means for supplying a fluid to said trough, the upper edge of said flange being notched whereby the fluid may flow over the same and down the sides of said baffle element to cover the same.

2. In combination, a gas passage, baffle elements in said gas passage in the path of the flow of gas through the same, means forming a fluid receiving trough adjacent the top of each baffle element, means for supplying fluid to said troughs, and means for flushing said troughs to clean the same.

3. In a device of the character described, a gas passage, a baffle element arranged in said gas passage, a flange associated with said baffle element and cooperating with the same to form a trough surrounding said baffle element adjacent the top thereof, means for supplying a fluid to said trough, the upper edge of said flange being notched whereby the fluid may flow over the same and down the sides of said baffle element to cover the same and means for discharging a fluid under pressure toward the notched edge of said flange and toward the bottom of said trough to effect a cleaning of the same.

4. In a device of the character described, a fluid tank, a baffle element suspended from the top wall of said tank and passing through an opening in the bottom wall thereof, said opening being formed with a flange spaced from said baffle element, and means for supplying a fluid to said tank, the spaced relation of said flange and baffle element providing a passage through which the fluid may flow from the tank over the sides of said baffle element.

5. In a device of the character described, a fluid tank, a baffle element suspended from the top wall of said tank and passing through an opening in the bottom wall thereof, said opening being formed with a flange spaced from said baffle element, means for supplying a fluid to said tank, the spaced relation of said flange and baffle element providing a passage through which the fluid may flow from the tank over the sides of said baffle element and means for moving said flange away from said baffle element to effect a flushing of the passage between the baffle element and the flange.

6. In a device of the character described, a baffle element, means surrounding said element adjacent the upper end thereof but spaced from the sides of the element to provide passages through which a fluid may flow over the sides of the element, and means for varying the spaced relation of said means from the sides of said element to effect a flushing of the passages between the element and the said means.

7. In a device of the character described, a baffle element, a flange associated with said element adjacent the upper end thereof, said flange being spaced from the element to provide a passage through which a fluid may flow over a side of the element, and means for moving said flange away from said element to effect a flushing of the passage between the element and the flange.

8. In a device of the character described, a baffle element, a flange surrounding said element adjacent the upper end thereof, said flange being spaced from said element to provide passages between said flange and element through which a fluid may flow over the sides of said element, and a member sleeved on said element and adapted to be moved into engagement with said flange to move said flange away from said baffle element to effect a flushing of the said passages.

9. In combination, a gas passage, a baffle element in said gas passage, means forming a fluid-receiving trough surrounding said baffle element, means for supplying fluid to said trough, and fluid discharge means associated with said trough for cleaning the same.

10. In combination, a gas passage, a baffle element in said gas passage, a flange associated with said baffle element and cooperating with the same to form a trough surrounding said baffle element, means for supplying a fluid to said trough, the upper edge of said flange being notched whereby the fluid may flow over the same and down the sides of the baffle element, and means for cleaning the notched edge of the flange.

11. In combination, a gas passage, a plurality of baffle elements in said gas passage in the path of the flow of gas through the same, and means forming a fluid-receiving trough surrounding each baffle element adjacent the upper end thereof, the fluid-receiving troughs of adjacent elements being at different elevations to provide for a close spacing of said elements.

NORMAN L. SNOW.